United States Patent [19]

Clauss et al.

[11] 4,399,415

[45] Aug. 16, 1983

[54] RESONANT ISOLATOR FOR MASER AMPLIFIER

[75] Inventors: Robert C. Clauss, La Crescenta; Rex B. Quinn, La Canada, both of Calif.

[73] Assignee: The United States of America as represented by the Administrator of the National Aeronautics and Space Administration, Washington, D.C.

[21] Appl. No.: 246,778

[22] Filed: Mar. 23, 1981

[51] Int. Cl.³ .......................... H01P 1/00; H01S 1/00; H01P 1/32

[52] U.S. Cl. .......................................... 330/4; 332/7.5; 333/24.2

[58] Field of Search .................. 330/4; 333/24.2, 24.1, 333/17 L; 332/7.5; 331/94

[56] References Cited

U.S. PATENT DOCUMENTS

| | | | |
|---|---|---|---|
| 3,213,382 | 10/1965 | Hensel | 330/4 |
| 3,214,701 | 10/1965 | Chen et al. | 330/4 |
| 3,299,364 | 1/1967 | Buchmiller et al. | 330/4 |
| 3,486,123 | 12/1969 | Clauss | 330/4 |
| 3,676,787 | 7/1972 | Clauss et al. | 330/4 |
| 3,753,162 | 8/1973 | Chorta | 332/24.1 |
| 3,845,413 | 10/1974 | Chinon et al. | 333/24.2 |
| 3,906,404 | 9/1975 | Dixon | 333/24.2 |
| 3,978,417 | 8/1976 | Clauss | 330/4 |
| 4,055,810 | 10/1977 | Trowbridge | 330/4 |
| 4,187,470 | 2/1980 | Clauss | 330/4 |

*Primary Examiner*—Nelson Moskowitz

*Attorney, Agent, or Firm*—Paul F. McCaul; John R. Manning

[57] ABSTRACT

An isolator is described for use in a low-noise maser amplifier, which provides low loss across a wide bandwidth and which can be constructed at moderate cost. The isolator (40) includes a train of garnet or ferrite elements (50, 52) extending along the length of a microwave channel (14) parallel to the slow-wave structure (24), with the elements being of staggered height, so that the thin elements (50) which are resonant to the microwaves are separated by much thicker elements (52). The thick garnet or ferrite elements reduce the magnetic flux passing through the thin elements (50), to permit altering of the shape of the thin elements so as to facilitate their fabrication and to provide better isolation with reduced loss, by increasing the thickness (T) of the thin elements and decreasing their length (L) and width (W).

11 Claims, 6 Drawing Figures

FIG. 1
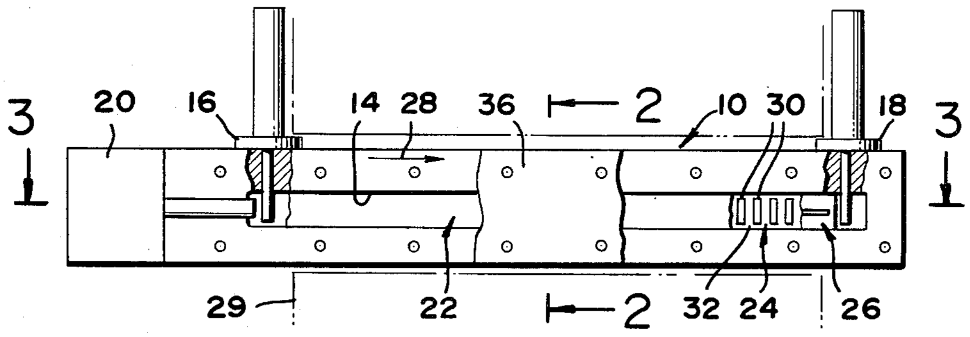
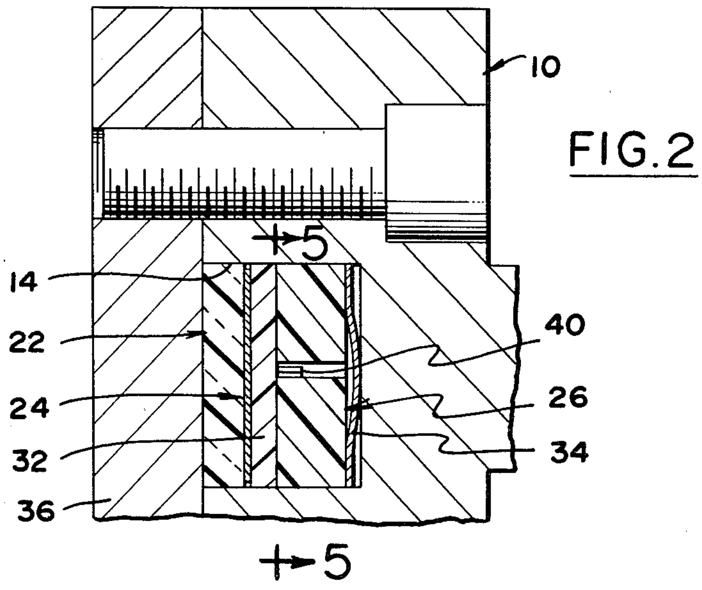
FIG. 2
FIG. 3
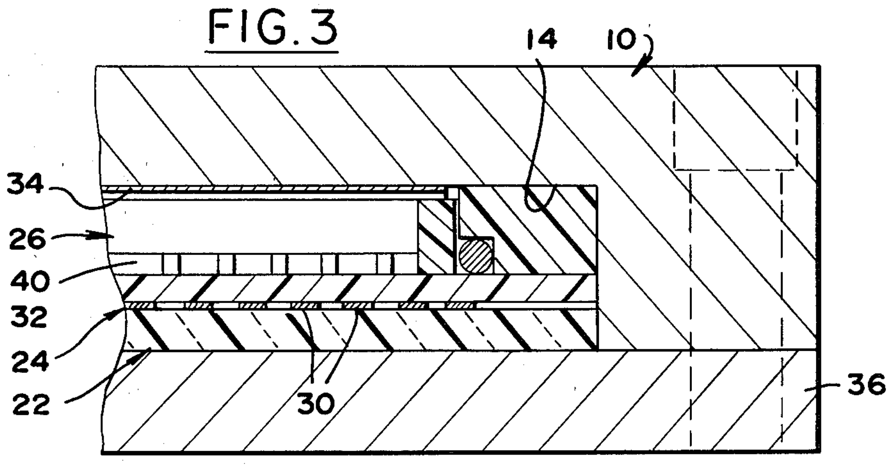

RESONANT ISOLATOR FOR MASER AMPLIFIER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Traveling wave maser amplifiers typically utilize a reverse isolation structure to attenuate microwaves traveling opposite to the forward direction along which signals are intended to be amplified. One type of isolator structure includes a continuous strip of constant cross section formed of garnet or ferrite material such as yttrium iron garnet (YIG) that extends along most of the length of the amplifier slow-wave structure. While such a continuous strip is relatively easy to fabricate and mount, it is fairly lossy, so there is perhaps an 8 to 10 db loss of signal traveling in the forward direction caused by the isolator. An important contributor to losses in such a continuous strip, is the presence of isolator material in the areas of the amplifier that are not circularly polarized.

Another type of isolator structure includes individual elements of YIG spaced at intervals along the length of the amplifier slow-wave structure, so that the isolator elements lie primarily in the circularly polarized regions of the amplifier. Such an isolator produces smaller losses. However, the isolator elements must be extremely thin, and involve greater efforts in fabrication and in accurately mounting them in place than for a continuous strip. For example, in mounting YIG elements for an X-band maser, where each element had a thickness of about 0.002 inch and where the thickness of each element was controlled to 0.00005 inch tolerance, it was found that the elements were extremely fragile and difficult to fabricate. An isolator structure which was somewhat easier to fabricate, and which produced low loss over a wide bandwidth, would be of considerable value.

SUMMARY OF THE INVENTION

In accordance with one embodiment of the present invention, an isolator structure is provided that can be used in a traveling wave maser amplifier which provides low loss and which can be fabricated at moderate cost. The isolator structure includes a train of isolator portions formed of magnetically soft material, and with different portions being of different permeabilities under the operating magnetic field of the maser amplifier. This can be accomplished by using block portions of the same material but different thicknesses or widths, or by using block portions of different materials. In one isolator structure, a first group of isolator portions lying in the circularly polarized regions of a maser amplifier, are of smaller thickness than a second group of portions that separate the first portions. The greater thickness of the second portions that lie in relatively non-circularly polarized regions, results in the second portions drawing away magnetic flux from the first portions, to permit the use of first portions that are thicker than individual elements spaced without magnetic material between them, to facilitate fabrication of the isolator structure and to reduce losses.

The isolator structure can include a train of isolator portions that are of substantially the same YIG material, but with first elements lying in circularly polarized regions being much thinner than second elements that lie inbetween them. The elements are mounted on a substrate to form a substantially continuous strip of staggered height.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial side view of a maser amplifier constructed in accordance with the present invention.

FIG. 2 is a view taken on the line 2—2 of FIG. 1.

FIG. 3 is a view taken on the line 3—3 of FIG. 1.

FIG. 6 is a perspective view of a portion of an isolator structure constructed in accordance with another embodiment of the invention.

DESCRIPTION OF THE PREFERRED EMBODIMENT

Figure 4:
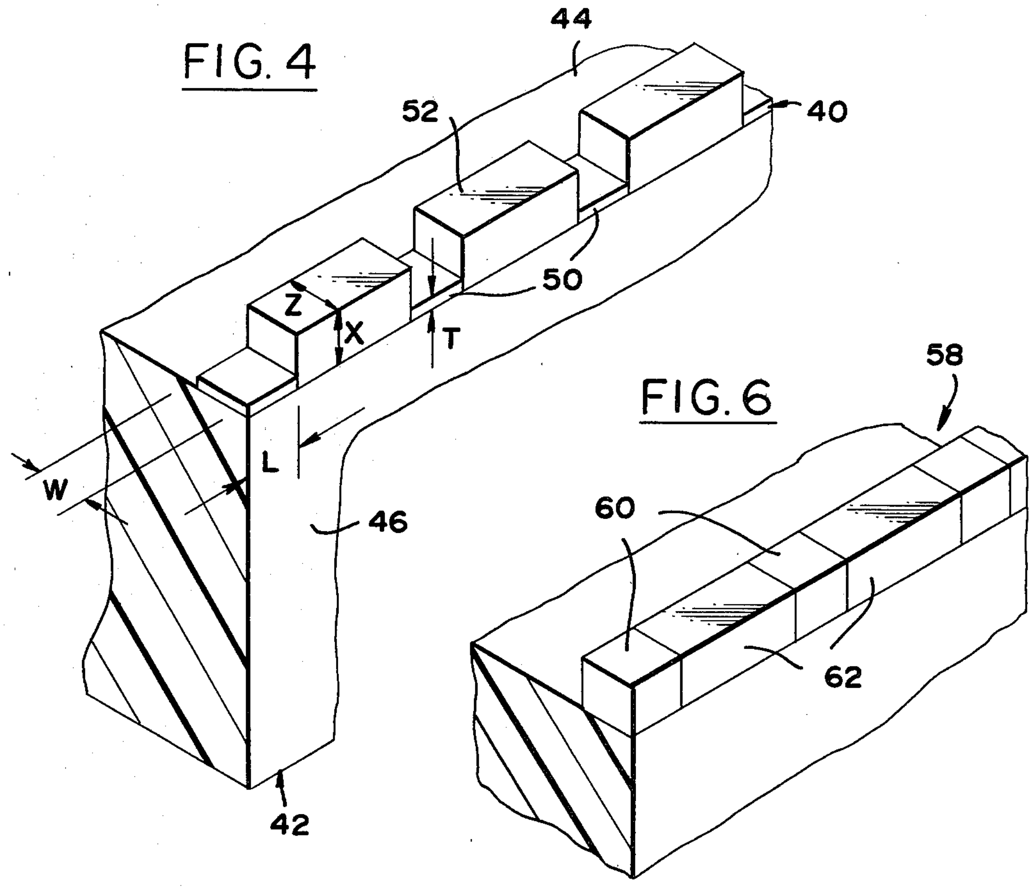
FIG. 4 is a perspective view of a portion of the maser amplifier of FIG. 2.

FIG. 1 illustrates a maser amplifier which includes a metal housing 10 forming a channel 14 which encloses a slow-wave structure 24 through which microwaves can propagate and be amplified. The microwave signals pass through the slow-wave structure from one coupling connector 16 to another 18, and power for amplifying the signal is received from a pumping source 20. As also shown in FIGS. 2 and 3, the amplifier includes a strip 22 of maser material such as ruby extending along the length of the waveguide channel, and a slow wave structure 24 extending parallel to the maser strip to slowly propagate the microwaves to provide greater efficiency in amplification. An isolator structure 26 of the present invention extends in a direction along the length of the channel 14, to permit the travel of microwaves in a forward direction, along the arrow 28 through the channel from the input 16 to the output 18, while greatly attenuating any signals traveling in the reverse direction. The direction of attenuation, whether in the direction of arrow 28 or in the reverse, depends upon the direction of the DC magnetic field applied by a magnet 29 which supplies a magnetic field that is vertical as seen in FIG. 2.

The maser amplifier shown in the drawings, includes a halfwave slow-wave structure 24 having multiple comb fingers 30 of a height of about one-half wavelength of the microwaves to be amplified. The metal fingers 30 are formed by printed circuit techniques on a strip 32 of dielectric material such as alumina. The various parts of the amplifier lying in the waveguide channel, are held in position by a leaf spring 34 that lies at one side of the channel. The leaf spring 34 presses against the isolator structure 26, to press the comb elements 30 on the backing strip 32 tightly against the maser strip 22, and to press the ruby maser material strip 22 tightly against a side plate 36 of the housing. The various parts are formed so that when pressed together, an isolator 40 of the isolator structure 26, lies at a precisely controlled position with respect to the slow wave structure 24.

Figure 5:
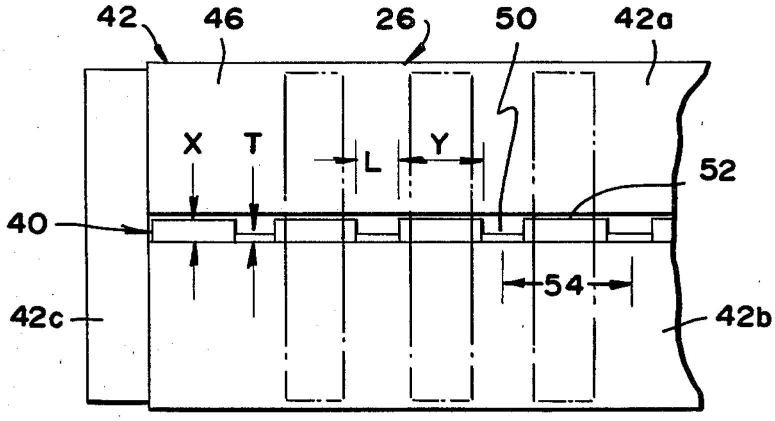
FIG. 5 is a view taken on the line 5—5 of FIG. 2.

The isolator structure 26 is formed, as shown in FIGS. 4 and 5, with a substrate 42 of alumina that supports the isolator 40. The substrate 42 is substantially in the form of a strip with a slot 44 extending along its length, while the isolator 40 is substantially in the form of a continuous strip of variable height that lies within the slot 44 and which is adhesively fastened to one surface of the slot and is flush with a face 46 of the substrate.

The isolator 40 is constructed of multiple elements of YIG (yttrium iron garnet) which is a garnet material that has desirable ferrimagnetic resonance properties at the cryogenic temperatures at which the maser amplifier is typically operated, to achieve very high gain and very low noise. The isolator 40 is formed by a train of the isolator elements, with a first group of the elements 50 constructed to a small thickness T as measured along the height of the channel, and with a second group of elements 52 constructed with a much greater thickness X along the height of the channel. The elements 50, 52 are held by adhesive to the substrate 42, with each first or thin element 50 abutting a second or thick element 52. The substrate 42 can be formed of two bars **42*a*, 42*b* joined together at their ends by end blocks 42*c***. The train of isolator elements is mounted on one of the bars, and then the bars and end blocks are joined.

In one maser amplifier that was utilized to amplify microwaves at a frequency of 8.5 GHz (gigahertz), each of the thin elements 50 was constructed with a depth or thickness T of 4 mil (one mil equals 0.001 inch), a length L of 25 mil, and a width W of 25 mil. Each of the thick elements 52 had a thickness X of 15 mil, a length Y of 55 mil, and a width Z of 25 mil. Thus, the centers of adjacent first isolator elements 50 are spaced apart by a distance 54 of 80 mil. The comb elements 30 are also spaced apart by 80 mil, and the first elements 50 are located halfway between adjacent comb elements 30, when viewed perpendicular to the length of the waveguide as in FIGS. 1 and 5. The centers of the first elements 50, and of the strip are offset from the comb elements 30 by a carefully determined distance, to place the first elements 50 in regions of circular polarization of the microwaves passing along the slow-wave structure.

The isolator 40 which forms a substantially continuous strip of staggered height, provides isolation with very low loss, which has been previously obtainable only by the use of separate single crystal garnet elements of a shape largely similar to that of the first elements 40 of the present structure. However, for a given microwave frequency and given applied magnetic field, the first or active elements 50 can be fabricated at lower cost than the prior art single crystal elements. This is largely due to the fact that the second, or thick elements 52 have a large magnetic permeability, and due to their considerable height much of the magnetic field that would otherwise pass through the thin elements 50 if they were merely isolated from one another without any intervening material, instead passes through the thick elements 52. The resulting lower magnetic field through the thin elements 50, enables the use of thin elements 50 of considerably greater thickness. In the previously described example wherein microwaves of 8.5 GHz are to be amplified, and wherein a magnetic field of about 5000 oersteds is applied to operate the maser strip, and wherein the thin elements 50 have a thickness of about 4 mil (0.004 inch), a comparable prior art single-spaced element isolator would utilize thin elements of about 2 mil thickness. The thickness of the active first elements 50 with respect to the area of their faces, is critical, and the 4 mil thick elements 50 were lapped to an accuracy of ±1/10th mil. Comparable prior art elements of 2 mil thickness would require even greater accuracy in construction, and in practice such extreme accuracy is difficult to achieve.

The increased thickness of the first elements 50, as compared to prior art isolated space elements (due to the presence of the thick elements 42 which draw away magnetic flux lines), also permits a decrease in the length L and width W of the first elements. Accordingly, more of the active material of these elements 50 are located within the regions of circular polarization of the microwaves, to provide reduced loss to microwaves passing in the forward direction and to provide high loss, or isolation, to waves traveling in the reverse direction. The use of alternate thick and thin elements, also has the advantage of enabling the thick elements 52 to accurately space the thin elements 50 apart, to facilitate the fabrication of the isolator. Thus, the staggered height strip formed of elements of alternate heights, enables thicker active elements 50 to be utilized, with the thickness of the elements less critical and with the elements being easier to handle, enables active elements 50 of smaller width and length to be utilized which achieves greater isolation, and enables easier accurate mounting of the elements on a substrate.

As compared to a prior art isolator of a continuous strip of uniform cross section throughout its length, the staggered height strip of the present invention is superior in that it provides lower microwave losses, resulting in a maser that achieves a greater gain-bandwidth product and lower noise. In the above example of an 8.5 GHz maser amplifier, a continuous strip isolator was found to provide signal losses of 8 to 10 db. The staggered height strip of the present invention reduced the losses to less than 2 db. As compared to a prior art isolator containing individual isolator elements, the staggered height strip of the present invention, with active elements of somewhat smaller length and width than the prior art, produces about the same forward loss.

The purpose of utilizing second elements 52 of much greater thickness X than the thin active elements 50 is to provide such a large magnetic permeability for the thick elements that they would be resonant at the operating frequency only at a much lower magnetic field than the magnetic field which is utilized to operate the maser material and which is applied to the entire isolator. This second elements 52 are therefore completely passive to microwave energy, yet provide a path of low reluctance (high permeability) to the biasing DC field thereby causing the thin active elements 50 to be in a region of reduced magnetic field. The term permeability herein refers to the ratio of the magnetic flux to magnetising force for a particular element, and the permeability of the element will increase if its thickness of width increases, or if it is constructed of material of greater unit permeability. Instead of utilizing the same or substantially the same material for the first and second elements 50, 52, it is possible to utilize material with different unit permeabilities or different saturation magnetizations. Different saturation magnetizations can be utilized since intense magnetic fields are utilized which exceed the saturation magnetization of many materials. Although YIG is almost exclusively utilized as the resonant isolator material in the prior art, many other ferrite or garnet materials could be used.

The isolator 40 is constructed of soft magnetic material, that is, material which is easily magnetised. The active block portions 50 of the isolator which lie in circularly polarized regions of the microwave energy are constructed of a microwave resonance isolator material, which is a material that is magnetically permeable, and that is nonreciprocal in that it passes circularly polarized microwave energy in one direction but not in the other. Garnet (e.g. YIG) and ferrite materials, which are materials having a high density of unpaired electrons, are the two materials that are known to be suitable. The nonactive block portions 52 of the isolator are utilized to affect the magnetic field, and therefore should have a considerable permeability. However, they are not utilized to stop microwaves passing in the unwanted direction, and do not have to be constructed of microwave resonance isolator material. All of the elements should have minimum loss.

FIG. 6 illustrates another isolator structure 58 which includes alternate blocks 60, 62 of different magnetic materials, wherein the alternate blocks may be of about the same thickness (or may be of very different thickness), but the nonactive blocks 62 have a higher permeability at the operating magnetic field of the maser amplifier. For example, the active elements 60 may be constructed of Type G-113 YIG manufactured by Trans-Tech Inc. (which has an initial permeability of 134,), while the inactive elements 62 may be constructed of Type TT 2-111 nickel-zinc ferrite manufactured by Trans-Tech Inc. (which has an initial permeability of 317.)

Thus, the invention provides an isolator structure which can be utilized in a traveling wave maser amplifier to absorb microwaves traveling in the reverse direction, which provides a wide bandwidth of operation, with very low forward loss, all in a structure that can be constructed at moderate cost. This is accomplished by utilizing a train of isolator portions, which may be formed by integral portions of a continuous strip or individual elements lying adjacent to one another, wherein a first group of the isolator portions have sharply lower magnetic permeability under the operating magnetic field present in the housing than do other portions lying in between the first isolator portions. This can be accomplished by utilizing a substantially continuous strip of staggered height, with the thin portions of the strip lying opposite the spaces between comb elements of a slow wave structure, and the thick portions lying between adjacent thin portions. The thick isolator portions draw some of the magnetic field away from the thin portions, so that the thin portions can be somewhat thicker than otherwise,, and of somewhat smaller width and length than otherwise, so that the thickness of the thin isolator portions is less critical and so that the smaller length and width can provide better isolation. The use of a train of adjacent elements facilitates the mounting of the elements on a substrate by permitting the elements to space one another along the length of the substrate.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a traveling wave maser which includes a pumped channel, a maser material strip extending along the channel, a slow wave structure including multiple comb fingers spaced along the channel, and means for applying a magnetic field within said channel, the improvement of an isolator extending along the channel, comprising:

a train of isolator portions extending along said channel substantially parallel to said slow wave structure, each isolator portion formed of magnetic material, a first group of said isolator portions formed of microwave resonance isolator material and being spaced apart and with each first isolator portion lying halfway between a postion opposite a pair of adjacent comb fingers, and the isolator portions of said first group having sharply different magnetic permeability under the operating magnetic field in said channel than isolator portions lying between said first isolator portions.

2. The improvement described in claim 1 wherein:

said train includes first isolator elements of a first thickness forming the isolator portions of said first group, and second isolator elements which are at least twice as thick as said first elements and which lie between said first elements.

3. The improvement described in claim 2 wherein:

each of said second elements fills the entire space between each pair of first elements to thereby precisely separate the first elements.

4. A maser amplifier comprising:

a housing having walls forming a channel;

a strip of maser material extending along said channel and having a first face lying against a channel wall;

a slow wave structure extending along said channel parallel to and adjacent to said maser material strip along a second face of the strip which is opposite said first face; and an isolator structure extending along said channel parallel to said maser strip and lying on a side of said slow wave structure which is opposite said maser strip;

said isolator structure including a substantially continuous strip of microwave resonance isolator material, extending parallel to said strip, said strip of isolator material having a variable thickness.

5. The amplifier described in claim 4 wherein:

said slow wave structure includes a plurality of fingers spaced from one another along the length of said channel; and said strip of isolator material includes thin portions lying at positions opposite the spaces between said fingers and thick portions that are at least twice as thick as said thin portions lying between said thin portions.

6. The amplifier described in claim 4 wherein:

said strip of isolator material includes thick and thin portions, each portion being formed of a separate block of material, and said blocks abut one another to form a substantially continuous strip.

7. An isolator for attenuating signals propagating in the reverse direction along a waveguide, comprising:

a train of blocks of microwave resonance isolator material of staggered height.

8. The isolator described in claim 7 wherein:

said isolator material is chosen from the group which includes yttrium iron garnet and ferrite material.

9. An isolator for attenuating signals propagating in the reverse direction along a waveguide, comprising:

a train of block portions of soft magnetic material, with at least first alternate block portions formed of microwave resonance isolator material, and with the second block portions lying between said first portions and having a much greater permeability than said first portions.

10. The isolator described in claim 9 including:

walls forming a maser amplifier channel;

a maser strip extending along said channel;

a slow wave structure extending beside said maser strip and forming regions of circularly polarized microwave energy when microwaves pass therealong; and means for applying a magnetic field through said maser strip and in regions adjacent thereto;

said train of block portions extending along said channel, with said first block portions lying in said regions of circularly polarized energy.

11. The isolator described in claim 9 wherein:

said second block portions are thicker than said first block portions.

* * * * *